United States Patent [19]
Johannesen et al.

[11] Patent Number: 5,529,149
[45] Date of Patent: Jun. 25, 1996

[54] DRUM-IN-HAT BRAKE WITH REVERSE SCISSORS ACTUATOR

[75] Inventors: Donald D. Johannesen, South Bend; Rodney R. Rodriguez, Granger, both of Ind.; Clyde E. Carr, Galien, Mich.; John R. Wegh, South Bend, Ind.

[73] Assignee: AlliedSignal Inc., Morristown, N.J.

[21] Appl. No.: 342,468

[22] Filed: Nov. 21, 1994

[51] Int. Cl.⁶ ................................................. F16D 63/00
[52] U.S. Cl. .................. 188/70 R; 188/2 D; 188/106 F; 188/78; 188/325
[58] Field of Search ................................ 188/2 D, 70 R, 188/106 F, 325, 327, 70 B, 328, 329, 330, 331, 332, 333, 336, 326, 106 A, 341, 78, 72.6; 74/102, 103, 104, 105, 106, 108; 403/331, 326

[56] References Cited

U.S. PATENT DOCUMENTS

| | | | |
|---|---|---|---|
| 1,970,680 | 8/1934 | Williams et al. | 188/328 |
| 2,910,144 | 10/1959 | Burnett | 188/70 B |
| 2,927,664 | 3/1960 | Burnett | 188/70 B |
| 2,937,720 | 5/1960 | Burnett | 188/106 A |
| 2,950,783 | 8/1960 | Mossey | 188/70 B |
| 2,953,221 | 9/1960 | Lucien | 188/73 |
| 3,023,853 | 3/1962 | Nawrot | 188/78 |
| 3,101,813 | 8/1963 | Parrett | 188/73 |
| 3,498,419 | 3/1970 | Belart | 188/327 |
| 3,557,912 | 1/1971 | MacAfee | 188/78 |
| 3,596,738 | 8/1971 | Newstead | 188/78 |
| 4,042,073 | 8/1977 | Dickenson | 188/72.9 |
| 4,236,614 | 12/1980 | Johannesen | 188/326 |
| 4,391,316 | 7/1983 | Seggio . | |
| 5,152,376 | 10/1992 | Weiler et al. | 188/2 |

FOREIGN PATENT DOCUMENTS

| | | | |
|---|---|---|---|
| 207995 | 5/1956 | Australia | 188/106 A |
| 1043407 | 10/1951 | France | 188/106 A |
| 1180635 | 10/1964 | Germany | 188/72.9 |
| 3608986A1 | 9/1987 | Germany . | |

Primary Examiner—Douglas C. Butler
Attorney, Agent, or Firm—Leo H. McCormick, Jr.

[57] ABSTRACT

The drum-in-hat assembly (10) comprises a disc brake (12) mounted slidably relative to a backing plate (18) which includes an opening (19) through which extends a reverse scissors actuator (40) for the drum brake (30) of the assembly (10). The drum brake (30) includes a pair of arcuate drum brake shoes (32, 34) supported relative to the backing plate (18), with the shoes (32, 34) having a pair of opposed brake shoe ends (36, 38) engaged by the actuator (40). The actuator (40) comprises a pair of levers (42, 46) pivotably attached to one another with each lever (42, 46) having a second lever end (48, 58) engaging a respective end (38, 36) of an associated brake shoe, wherein the second lever end (48, 58) has either a slot (49) or an edge (59) located laterally away from the other and engaging the associated brake shoe end (38, 36). The actuator (40) is free to float relative to the backing plate (18), and the levers (42, 46) are located within a housing (70) attached to the backing plate (18).

15 Claims, 3 Drawing Sheets

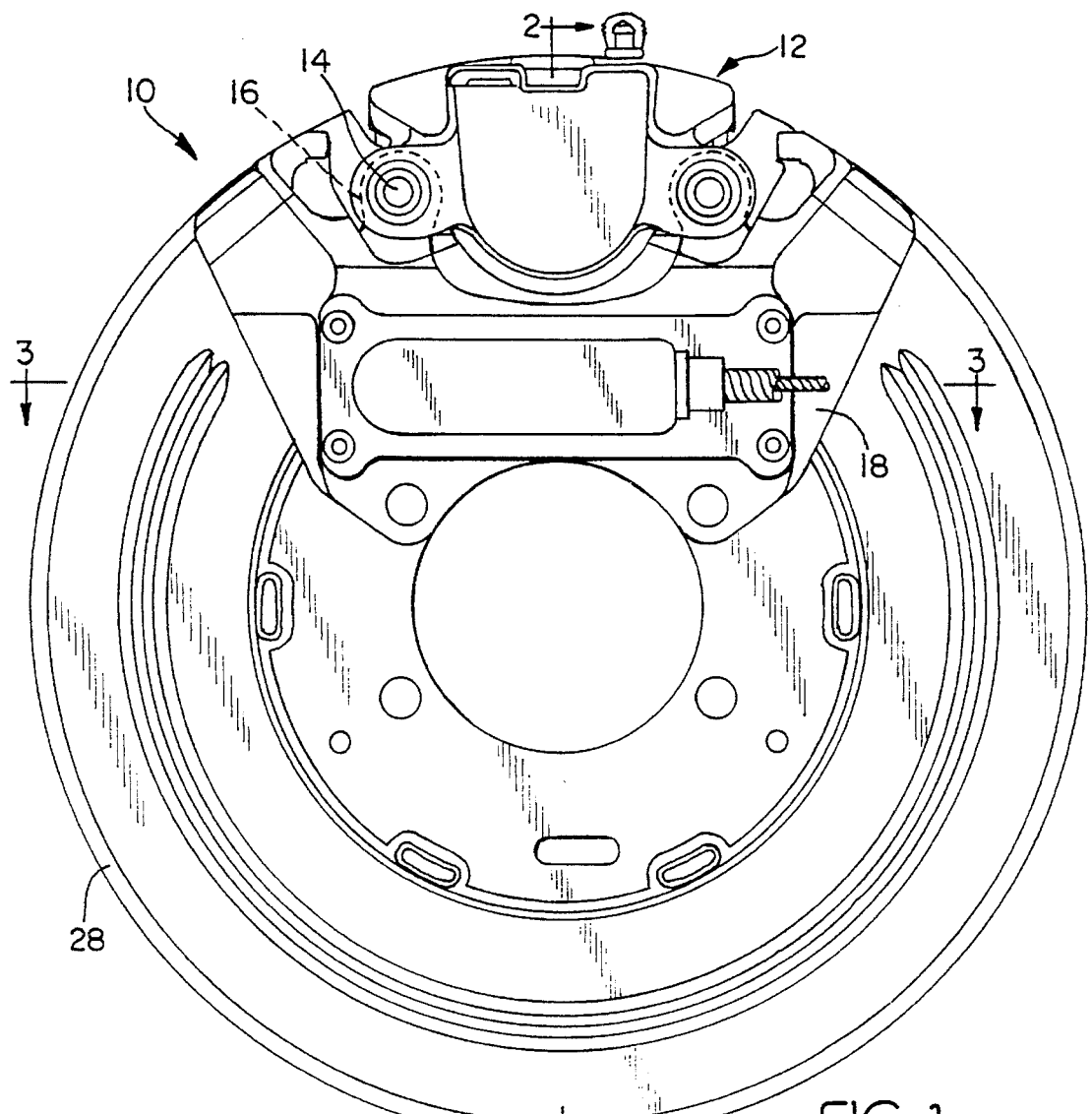
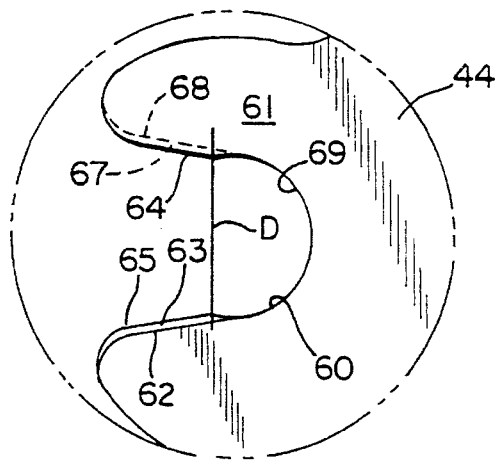
FIG. 4
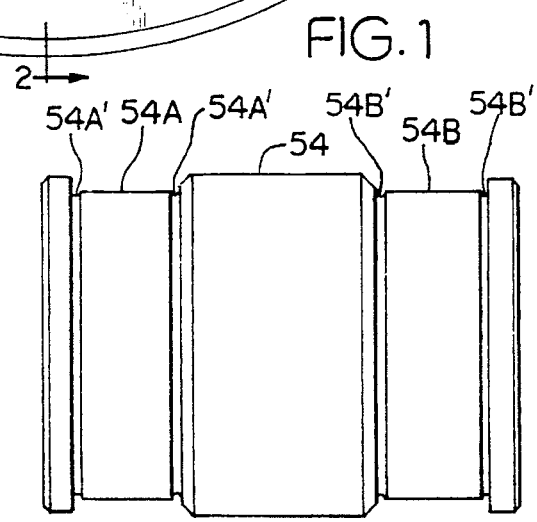
FIG. 5

DRUM-IN-HAT BRAKE WITH REVERSE SCISSORS ACTUATOR

The present invention relates generally to drum-in-hat brake assemblies, and in particular to a drum-in-hat brake assembly having the drum brake actuated by a reverse scissors actuator.

Drum-in-hat brake assemblies, such as in U.S. Pat. No. 5,180,037, have been utilized on the rear axles of vehicles in order to provide a disc brake for service braking and a drum brake for parking. The disc brake is a hydraulically actuated brake while the drum brake typically is a mechanically actuated brake. Various lever mechanisms can be utilized to actuate the drum brake. It is highly desirable to provide a simple but robust mechanical actuator for the drum brake, the mechanical actuator eliminating the need or use of a strut that is typical in many mechanical actuators. Additionally, it is highly desirable that the actuator provide equal actuation forces for both directions of potential vehicle movement, forward and backward. Thus, if the vehicle is parked on a hill that tends to make the vehicle roll in either the forward or reverse direction, the same parking brake force is available for keeping the vehicle parked and preventing movement in either direction. It is desirable that the actuator not require the cast backing plate to include projections, abutment housing, and other structures which add significantly to the total weight of the drum-in-hat assembly. It is also desirable that the actuator be able to float freely between the respective ends of the drum brake shoes, while not imposing reaction forces on any housing members for the actuator.

The present invention provides solutions to the above by providing a drum-in-hat brake assembly having a parking brake assembly with a reverse scissors actuator, comprising a pair of drum brake shoes supported relative to a backing plate, the reverse scissors actuator comprising a pair of levers attached pivotably to one another, each lever having first and second lever ends with the second lever ends located between and engaging a pair of opposing ends of said brake shoes, a first lever of said levers having first lever end means for cable means to pass therethrough, the first lever end of the first lever extending to said second lever end which engages an end of the adjacent brake shoe, the second lever end of the first lever located on a lateral side of said first lever opposite from and facing away from said second lever, the second lever having a first lever end for attachably receiving said cable means, and the second lever having a second lever end which engages the adjacent brake shoe end and the second lever end disposed laterally on a side of said second lever facing away from said first lever, displacement of the second lever by the cable means causing the second lever ends to move the respective ends of the brake shoes laterally away from one another to effect braking.

One way of carrying out the invention is described in detail below with reference to the drawings which illustrate an embodiment in which:

FIG. 1 is an inboard view of the drum-in-hat brake assembly in accordance with the present invention;

FIG. 4 is a partial view of one lever of the reverse scissors actuator; and

FIG. 5 is a view of the pin of the reverse scissors actuator.

Figure 2:
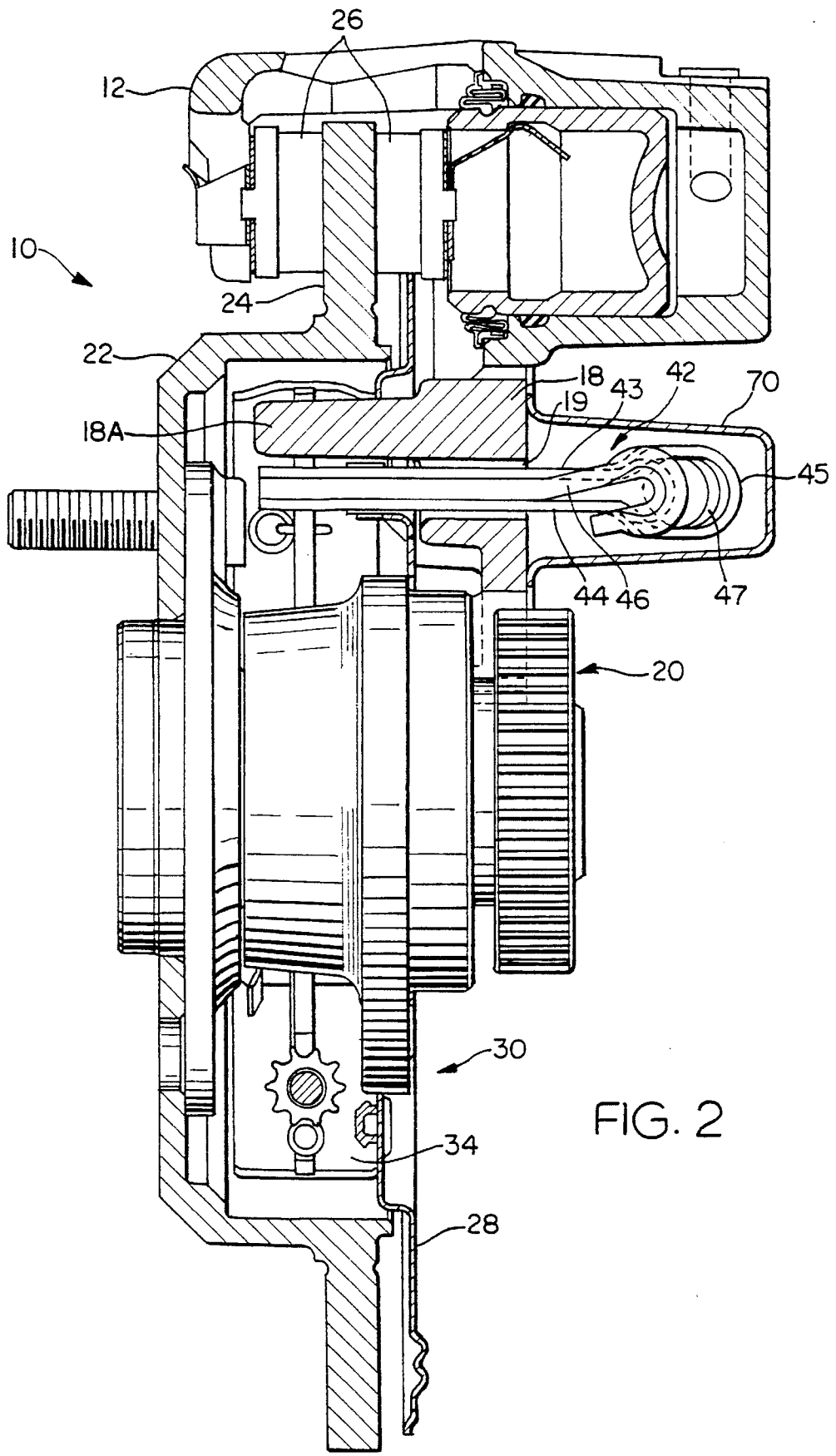
FIG. 2 is a section view taken along view Line 2—2 of FIG. 1.
Figure 3:
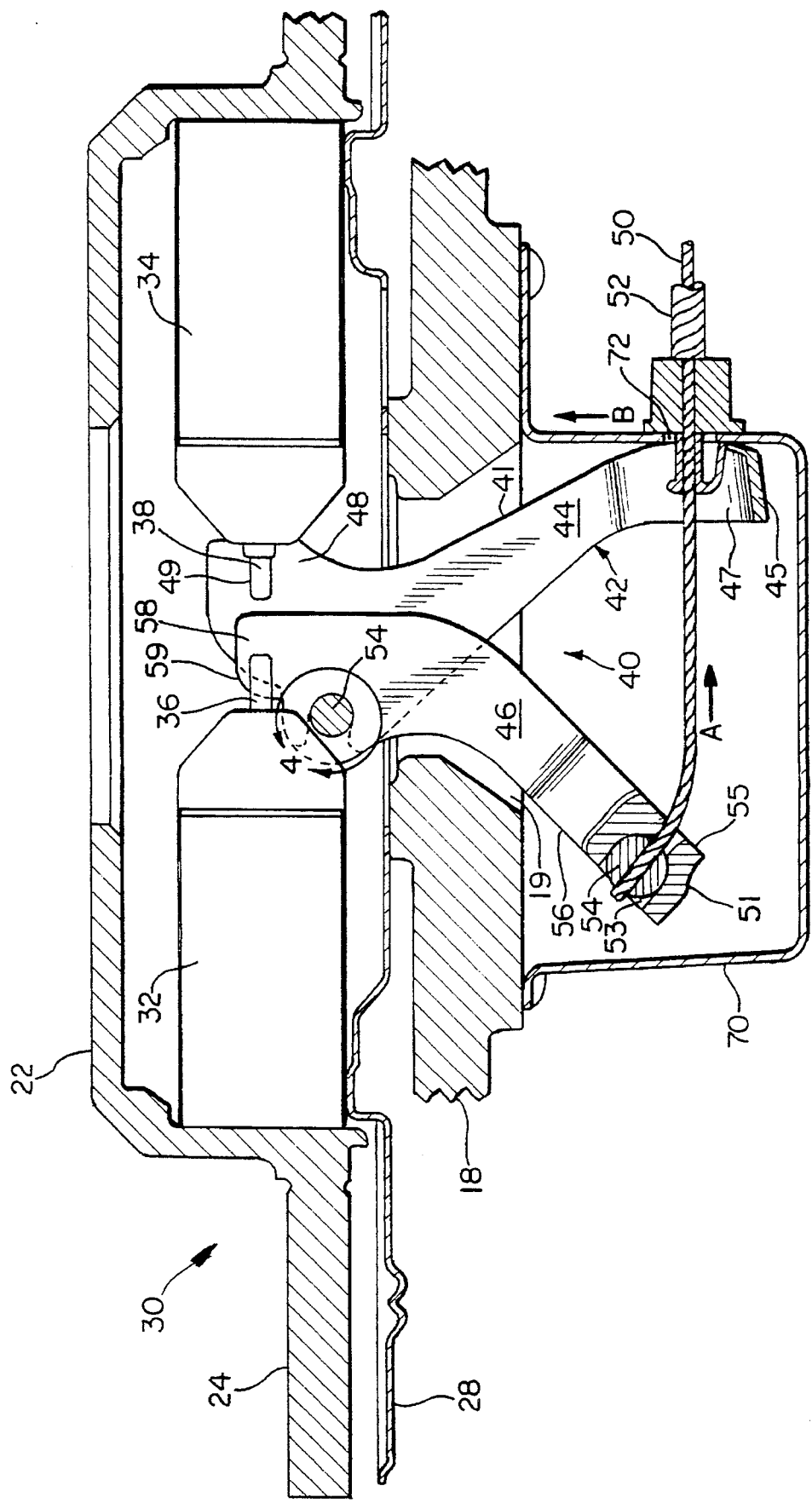
FIG. 3 is a partial section view taken along view Line 3—3 of FIG. 1.

Referring to FIGS. 1 and 2, the drum-in-hat brake assembly is referenced generally by numeral 10. Drum-in-hat brake assembly 10 includes a disc brake 12 mounted slidably by pins 14 to a bracket 16 connected integrally with a backing plate 18. The backing plate 18 is supported stationarily relative to a hub assembly 20, with a drum 22 attached rotatably to a not shown axle. Drum 22 includes an outwardly radially extending disc 24 located axially between disc brake pads 26. Attached to backing plate 18 is a drum brake dust shield 28 which keeps dust, water, and other contaminants from the interior of a drum brake designated generally by reference numeral 30. As illustrated in FIG. 3, drum brake 30 includes a pair of drum brake shoes 32, 34 which are supported relative to the backing plate 18 and one of which engages the anchor block 18A during braking. Drum brake shoe 32 includes a first end 36 disposed opposite a first end 38 of drum brake shoe 34. Each of the shoes 32 and 34 are part of the duo-servo drum brake 30 which, when actuated, expands the shoes into engagement with the drum 22 to effect a parking brake application for the vehicle. The disc brake 12 is a hydraulically actuated disc brake which when actuated engages friction pads 26 with the sides of rotor 24 to effect service braking for the vehicle. It should be clearly understood that disc brake 12 can be one of several types of disc brakes which include a caliper slidably mounted relative to a support member by means of pins, rails, and so on. Drum brake 30 may comprise a duo-servo drum brake or a non-servo drum brake, depending upon the particular vehicle application.

Referring to FIG. 3, the backing plate 18 includes an axial opening 19 through which extends a reverse scissors actuator designated generally by reference numeral 40. Located about the actuator 40 is a sheet metal housing 70 having an opening 72 through which extends a cable 50 housed within a conduit 52 snap-fitted to housing 70. Cable 50 includes a ball or other shaped end member 54 received by the actuator. The actuator 40 comprises a first lever 42 which includes a first lever part 43 and a second lever part 44 (see FIG. 2; cable 50 and end member 54 deleted for clarity) receiving a second lever 46 within parts 43, 44. First lever part 43 and second lever part 44 are joined integrally an loop lever end 45 which defines an opening means 47 through which extends the cable member 50. First lever member 42 extends in an axial direction relative to brake 10 to a first lever second end 48 having a slot 49 receiving therein and engaging abuttingly the shoe end 38. Second lever 46 extends axially to a second lever second end 58 having an edge 59 abutting the web of shoe end 36. Levers 42 and 46 are connected together by a pin 54. Pin 54 is snap-fitted into engagement with lever parts 43 and 44 and is not anchored in any manner to the backing plate or any other portion of the drum brake assembly 30. Second lever 46 includes a rounded socket end 51 defining a socket 53 which captures the ball end member 54 attached to cable 50. Each lever 42 and 46 is attached pivotally relative to one another such that when loop lever end 45 and second lever end 55 move toward one another as cable 50 is retracted through conduit 52, the second ends 48 and 58 move away from one another to move the brake shoes 34 and 32, respectively, into engagement with the drum 22 to effect a parking brake application. First lever 42 includes a lateral lever side 41 located on a side of lever 42 adjacent the associated brake shoe 34, and second lever 46 includes a lateral lever side 56 located on a lateral side of lever 46 that is adjacent the associated brake shoe 32. Second end 48 of first lever 42 is located on the same side of lever 42 as the side 41, while second end 58 of second lever 46 is located on the same side of lever 46 as side 56. The result is that when cable 50 is retracted, ends 48 and 58 move laterally away from one another, as opposed to moving toward each other as would occur in a typical "scissors" type of connection. This reverse-scissors configuration permits a very simple and robust design for actuator 40 which, unlike prior designs, does not effect an axial displacement of a part relative to the backing plate 18, does not require additional links or levers to effect displacement of the drum brake shoes, and does not require the anchoring of the pin 54 relative to the backing plate 18.

In operation, the vehicle driver will depress a parking brake pedal or retract a parking brake lever which causes cable 50 to move in the direction of Arrow A in FIG. 3. As cable 50 moves in the direction of Arrow A, second lever 46 is moved laterally in the direction of Arrow A and toward first lever 42. Because levers 42 and 43 are free to move relative to backing plate 18 as a result of the free floating pin 54 which attaches the levers to one another, the levers may move within the backing plate opening 19 as the ends 48 and 58 move the brake shoe ends 38 and 36 away from one another to bring the shoes 34 and 32 into engagement with drum 22. When a parking brake application is effected, the movement of second lever 46 as a result of the retraction of cable 50 causes first lever 42 to move slidingly in the direction of Arrow B in FIG. 3. Because pin 54 is free floating, no reaction loads are imposed by first lever 42 on the thin sheet metal housing 70, other than the metal housing 70 adjacent opening 72 being squeezed between conduit 52 and loop lever end 45. However, there are no reaction forces imposed on housing 70 which would cause housing 70 to be distorted or bent in the area of opening 72.

Drum brake 30 is a duo-servo drum brake but could also be a non-duo-servo drum brake wherein the lower portion of the brake in FIG. 2 is anchored relative to the backing plate 18 and dust shield 28. Because the actuator 40 is free floating within opening 19 and relative to the backing plate 18, actuator 40 effects equal forces upon the brake shoes 32 and 34 regardless of the direction in which the vehicle imposes forces upon the brake shoes during a parking brake application. In a mechanically actuated drum brake having an actuator with a strut, different forces are imposed upon the brake shoes for different potential directions of movement of the vehicle. However, the present invention provides a reverse scissors actuator which effects equal forces regardless of which direction inertia would tend to make the vehicle roll.

FIG. 4 illustrates the slotted opening utilized on lever part 44 of first lever 42. The slot 60 includes a first edge 62 and a second edge 64 which receives therebetween the pin 54 as the pin moves into the semicircular portion 69. First edge 62 is adjacent a recessed surface 63 extending at an angle toward an edge or projection 65 which is located adjacent the opposing surface of lever part 44. In complementary fashion, edge 64 adjacent surface 61 comprises a projection which angles via a recessed surface 67 to edge 68 located adjacent the opposite surface of lever part 44. Thus, each lever part 44 and 43 includes a similar slotted opening 60 which enables a snap-together engagement of the pin 54 with the lever parts 43, 44. As illustrated in FIG. 5, pin 54 includes recessed areas 54A and 54B each of which include slots 54A' and 54B', respectively. The slots 54A' and 54B' receive the projections 65 and 64 of each of the first and second lever parts 43, 44 so that as the recessed areas 54A and 54B are received snugly within the semi-circular portions 69 (located to the right side of Line D illustrated in FIG. 4) the snap-together connection is effected.

We claim:

1. A drum-in-hat brake assembly having a parking brake assembly with a reverse scissors actuator, comprising a pair of drum brake shoes supported relative to a backing plate, the reverse scissors actuator comprising first and second levers attached pivotably to one another, said first and second levers each having first and second lever ends with the second lever ends being located between and engaging a pair of opposing ends of said brake shoes, said first lever having a first lever end means for cable means to pass therethrough, the first lever end of said first lever extending to said second lever end which engages an end of an adjacent brake shoe, the second lever end of said first lever being located on a lateral side of said first lever opposite from and facing away from said second lever, said first lever comprising a pair of spaced-apart lever parts which receive therein a portion of said second lever, said lever parts each including a slotted opening which provides a snap-together connection with pin means, the second lever having a first lever end for attachably receiving said cable means, and the second lever having a second lever end which engages the adjacent brake shoe end and the second lever end disposed laterally on a side of said second lever facing away from said first lever, displacement of said second lever by the cable means causing said second lever ends to move the respective ends of the brake shoes laterally away from one another to effect braking.

2. The drum-in-hat brake assembly in accordance with claim 1, wherein the second lever end of the second lever includes socket means for receiving an end of said cable means.

3. The drum-in-hat brake assembly in accordance with claim 1, wherein each of said lever parts at the respective slotted opening includes a protruding portion and a recessed portion at opposing edges thereof.

4. The drum-in-hat brake assembly in accordance with claim 3, wherein the protruding and recessed portion of both levers parts are disposed opposite one another such that the protruding portion adjacent one side surface of the associated lever is disposed opposite a recessed portion located adjacent the same surface of the lever part.

5. The drum-in-hat brake assembly in accordance with claim 1, wherein said pin means is connected only with the first and second levers, and moves freely relative to said backing plate.

6. The drum-in-hat brake assembly in accordance with claim 1, further comprising means for housing the first lever ends of the first and second levers, the housing having an opening therein through which extends said cable means.

7. The drum-in-hat brake assembly in accordance with claim 1, wherein the drum brake comprises a duo-servo drum brake.

8. The drum-in-hat brake assembly in accordance with claim 7, wherein the drum-in-hat assembly comprises a hydraulic disc brake slidably mounted relative to the backing plate and having disc brake pads disposed adjacent a rotor which extends radially from a drum of said parking brake assembly.

9. A drum-in-hat brake assembly having a disc brake assembly and a parking brake assembly with a reverse scissors actuator, comprising a pair of drum brake shoes supported relative to a plate, the reverse scissors actuator comprising first and second levers attached pivotably to one another and each lever having first and second lever ends with the second lever ends located between and engaging a pair of opposing ends of said brake shoes, the first lever permitting at the first lever end cable means to extend therepast, the first lever end of the first lever extending to said second lever end which engages an end of the adjacent brake shoe and the second lever end of the first lever located on a lateral side of said first lever opposite from and facing away from said second lever, said first lever comprises a pair of spaced-apart lever parts receiving therebetween a portion of said second lever, each lever part of said first lever includes a slotted opening which provides a snap-together connection with pin means, the second lever having a first lever end for attachably receiving said cable means and a second lever end which engages the adjacent brake shoe end such that the second lever end is disposed laterally on a side of said second lever facing away from said first lever, displacement of the second lever by the cable means causing the second lever ends to move the respective ends of the brake shoes laterally away from one another to effect braking.

10. The drum-in-hat brake assembly in accordance with claim 9, wherein the second lever end of the second lever includes socket means for receiving an end of said cable means.

11. The drum-in-hat brake assembly in accordance with claim 9, wherein each of said lever parts at the respective slotted opening includes a protruding portion and a recessed portion at opposing edges thereof.

12. The drum-in-hat brake assembly in accordance with claim 9, wherein said pin means is connected only with the first and second levers, and moves freely relative to said backing plate.

13. The drum-in-hat brake assembly in accordance with claim 9, further comprising means for housing the first lever ends of the first and second levers, the housing having an opening therein through which extends said cable means.

14. The drum-in-hat brake assembly in accordance with claim 9, wherein the drum brake comprises a duo-servo drum brake.

15. The drum-in-hat brake assembly in accordance with claim 9, wherein the disc brake assembly comprises a hydraulic disc brake slidably mounted relative to the backing plate and having disc brake pads disposed adjacent a rotor which extends radially from a drum of said parking brake assembly.

* * * * *